Figure 1:
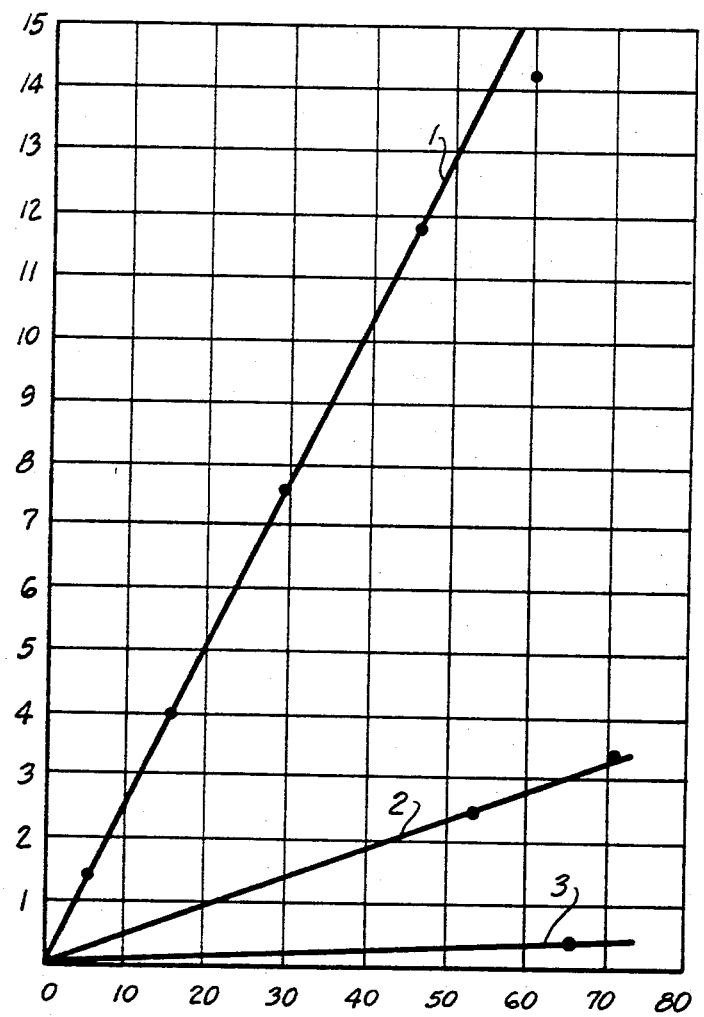
Figure 2:
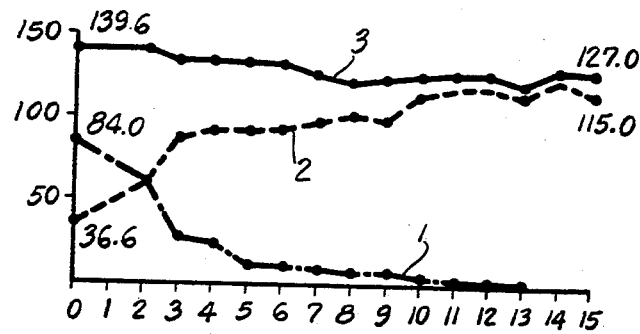
Figure 3:
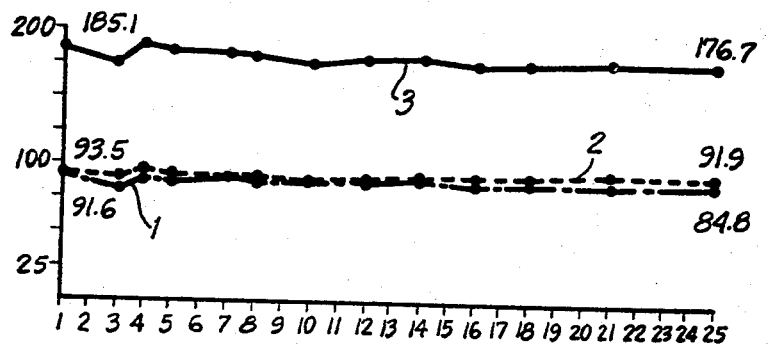

З,408,163
ANTHRAQUINONE PROCESS FOR THE PRODUCTION OF HYDROGEN PEROXIDE
Valentin Iosifovich Franchuk, Ulitsa Marii Uljanovoi 9, korp. 1, Apt. 96, and Tatjana Borisovna Andrianova, Butyrsky val 7, Apt. 7, both of Moscow, U.S.S.R., and Mikhail Dmitrievich Bobyshev, deceased, late of Barrikadnaja ulitsa 8, korp. G, Apt. 63, Moscow, U.S.S.R., by Jury Mikhailovich Bobyshev, Dina Ivanovna Bobysheva, and Irina Mikhailovna Bobysheva, administrators, all of Moscow, U.S.S.R.
Filed Oct. 6, 1964, Ser. No. 403,446
7 Claims. (Cl. 23—207)

This invention relates to production of hydrogen peroxide using alkylated anthraquinones, tetrahydroanthraquinones, and mixtures thereof as hydrogen intermediates.

The known processes for the production of hydrogen peroxide using derivative anthraquinones as intermediates consist in hydrogenating anthraquinone solutions in the presence of a catalyst obtained by leaching a nickel-aluminum alloy. The resultant anthrahydroquinones, after separation of the catalyst, are oxidized by means of oxygen to produce hydrogen peroxide which is then recovered by aqueous extraction.

Upon regeneration, the working solution is recycled. The known processes involve a catalytic hydrogenation of the alkylanthraquinones, a step wherein not only the hydrogen combines with carbonyls but also the aromatic nucleus is hydrogenated. This side reaction is characteristic of any alkylanthraquinone employed in the production of hydrogen peroxide.

Thus, the cyclic process for the production of hydrogen peroxide necessarily entails a gradual conversion of the alkylanthraquinones to tetrahydroanthraquinones and other undesirable by-products.

The aforementioned side reaction constitutes an acute drawback of the known process for the production of hydrogen peroxide which lies in that it ties up the essential intermediate substance, and deteriorates the constancy of components proportion in the working solution, thus limiting the scope of recycling.

Nor does the side reaction permit the increase of the hydrogenation temperature and hence the solubility of the resultant alkylanthrahydroquinones, whereas the concentration of the latter in the solution is in a great degree determinative for the final yields of hydrogen peroxide.

Hydrogenation by the prior art methods which proceeds under mild conditions, nevertheless does not eliminate the need to withdraw tetrahydroanthraquinone formed and accumulated in the working solution either periodically or continuously (U.S. Patent 2,739,042), or else, it has to be reconverted to the anthraquinone by catalytic dehydrogenation under fairly rigid conditions.

The methods available for suppressing the side reaction using a nickel catalyst modified by salts of certain acids (WGFR Patent 801,804), amines, nitriles etc. have so far been only partly successful. Nor has the side reaction been eliminated by the use of other catalysts, such as palladium supported on active alumina (U.S. Patent 2,689,169).

The object of this invention is to eliminate the above disadvantages and, in particular, to furnish a process for the production of hydrogen peroxide which suppress the side hydrogenation of the alkylanthraquinone nucleus and maintains the concentration of the alkylanthraquinone mixtures at a constant required level.

To solve this problem it was necessary to obtain a hydrogenation catalyst that promotes the selective conversion of the alkylanthraquinones to alkylanthrahydroquinones and more specifically, hydrogenation of the carbonyls of said alkylanthraquinones without encroachment upon the double bonds of the aromatic nucleus, that is, without ring hydrogenation.

This invention provides a procedure for preparation of the hydrogenation catalyst, i.e., a nickel-aluminum catalytic alloy such as promotes the selective hydrogenation of the alkylanthraquinone carbonyls.

The essential conditions for obtaining the desired selectivity of the catalyst, which this invention stipulates, are the temperature conditions and the time of leaching at this temperature.

The time and temperature for leaching said catalyst should be coordinated with the conditions adopted for a particular hydrogenation procedure, and especially so, with the temperature and degree of hydrogenation, with the hydrogenation capacity of the nucleus of the alkylanthraquinone selected as well as with the solvent employed, a solvent which tends to modify the nature of the process.

Graph 1 shows by way of illustration the curves for hydrogenating the nucleus of 2-ethylanthraquinone in the presence of catalysts that have been leached at temperatures varying with the degree of hydrogenation of carbonyls.

The 2-ethylanthraquinone was hydrogenated at 40° and, after oxidation of the hydrogenated solution, the composition of the resultant tetrahydro-2-ethylanthraquinone was determined by the polarographic method.

Curve 1 refers to the catalyst leached at 80° for 2 hours; curve 2 relates to the catalyst leached at 107° for 1 hour, and curve 3 for the catalyst being leached at 130° for 1 hour.

As is seen from the graph, the higher the leaching temperature, the lower is the degree of hydrogenation of the aromatic nucleus.

The selectivity of hydrogenation has been shown experimentally to be dependent on the leaching temperature rather than on the leaching time.

It has been also found that the catalysts obtained by prolonged leaching at 200° and over do not affect the aromatic nucleus of 2-ethylanthraquinone even with complete hydrogenation of the carbonyls.

It stands to reason that, the ratio between the selectivity of the catalyst and the conditions of leaching being known, it should be possible to obtain catalysts for various hydrogenation procedures, so far as the temperature and the degree of hydrogenation for alkylanthraquinones are concerned.

This can be equally applied to any alkylated anthraquinones or mixtures thereof that are selected for the process and dissolved in any suitable solvent.

Such a catalyst, if applied, maintains the required concentration of the anthraquinones recycled; it also maintains the constant ratio between the components in mixtures of the anthra- and tetrahydroanthraquinones recycled.

This is all the more important since tetrahydroanthraquinones are also hydrogen intermediates and hence the $H_2O_2$ yield may be increased by the use of mixtures of alkylanthraquinones and tetrahydroanthraquinones in their highest total concentration.

The advantage of such practice is that the total solubility of several anthrahydroquinones dissolved in a given suitable solvent will always exceed that of each individual component.

This is especialy important in raising the concentrations of the anthrahydroquinones, since most of the solvents employed in the process have low solving capacities.

As might be expected in a process wherein every constituent remains chemically stable, two or more quinones might be applied, provided the solubility of the hydroquinones, and hence the yield of hydrogen peroxide, are increased.

The application of the selective catalyst has an additional value of promoting anthraquinone hydrogenation at temperatures exceeding those employed in the prior art processes.

Another essential advantage of the proposed process is that the application of the selective nickel catalyst dispenses with either regular replacement or deep regeneration of the working solutions.

The composition of the working solutions is sufficiently balanced by the additions making up for the mechanical losses which said solutions sustain in the course of production.

In accordance with this invention, the catalyst is obtained by leaching a crushed nickel-aluminum alloy in a 20 percent NaOH solution. After introduction of the total amount of alloy and termination of the vigorous evolution of hydrogen, the reaction mass is heated to the required point and is retained at this temperature for a predetermined period of time.

Thereupon the catalyst is allowed to settle and, after decanting the aluminate solution, it is washed with water and treated as in the conventional procedures.

To prevent the aluminates from depositing onto the catalyst surface after introduction of the total amount of the alloy and termination of the vigorous evolution of hydrogen, it is advisable to heat the reaction mass to the boiling point and to maintain it at this temperature, e.g., for 30 to 60 minutes; thereafter the alkaline solution may be replaced by a fresh solution and the temperature raised to the required point.

The efficiency of said catalyst is illustrated by graphs 2 and 3.

Graph 2 shows changes in the composition of quinones, i.e., of 2-ethylanthraquinone and tetrahydro - 2 - ethylanthraquinone resulting from hydrogenation per pass using a catalyst leached at 107°. Curve (1) shows changes in 2-ethylanthraquinone content, curve (2) shows changes in tetrahydro - 2-ethylanthraquinone content, curve (3) shows changes in their total content. The graph is based on the work of an experimental plant engaged in a continuous process.

Graph 3 refers to the same mixtures tested in a cycle using a catalyst leached at 130°.

The following examples illustrate the efficiency of application of said catalyst.

*Example 1*

A crushed nickel-aluminum alloy containing about 50% of nickel was leached in a 20% alkaline solution (NaOH) by a usual procedure in an autoclave supplied with a power-driven agitator and a jacket for cooling and heating.

Upon introduction of the total amount of alloy and termination of the vigorous evolution of hydrogen, the mass was heated to the boiling point of 105 to 107° and kept at that temperature for 1 hour. The catalyst was allowed to settle and the aluminate solution was decanted. The autoclave was then filled with a fresh caustic soda solution of specific gravity of 1.23 to 1.25, the agitator was switched on and the temperature raised to 130°, the pressure in the autoclave being raised sufficiently to prevent water boiling out of the solution.

This subsequent treatment of the catalyst with alkali at an increased temperature with agitating lasted 1 to 3 hours. After leaching, the alkali solution was separated from the catalyst which was then washed and treated as in the older procedures.

The catalyst thus prepared was used in a cyclic process of hydrogen peroxide production, namely, for hydrogenating a mixture of 2-ethylanthraquinone and tetrahydro-2-ethylanthraquinone dissolved in a mixture of alpha- or beta-methylnaphthalene and secondary octanol.

The total content of quinones was 175 to 185 grams per liter, the ratios being practically the same. The hydrogenation temperature was 40 to 42°.

Under these hydrogenation conditions there was no appreciable change in the composition of the working solutions or in the ratio of 2-ethylanthraquinone and tetrahydro-2-ethylanthraquinone.

The yield of hydrogen peroxide was 12 to 12.5 grams per liter of the working solution, while the concentration of the aqueous solutions was 27.5 to 29 percent by weight.

*Example 2*

The catalyst was prepared as described in Example 1.

The catalyst thus prepared was used in a cyclic process of hydrogen peroxide production using a treble mixture of 120 grams per liter of 2-ethylanthraquinone, 100 g./liter of tetrahydroanthraquinone and 10 to 40 g./liter of tetrahydro-2-ethylanthraquinone with a total concentration of 230 to 240 g./liter.

The hydrogenation was conducted at a temperature of 42°. The yield of hydrogen peroxide was 16 to 17 g./liter.

Likewise, there were no changes either in the composition of working solution or in the ratios of quinones.

The solvent employed was a mixture of alpha- or beta-methylnaphthalene and secondary octanol.

*Example 3*

The catalyst prepared as in Example 1 was used in a cyclic process of hydrogen peroxide production. The working solution was a mixture of 120 g./liter of 2-ethylanthraquinone, 90 g./liter of tetrahydro-2-ethylanthraquinone, and 30 g./liter of tetrahydro-2-methylanthraquinone. The hydrogenation was conducted at 40°. The hydrogen peroxide yield was 15.5 to 16 g./liter of the solution, the concentration of aqueous extracts of hydrogen peroxide was 36 percent by weight.

*Example 4*

The catalyst was prepared as in Example 1 with the difference that the leaching temperature was 140° and the leaching time 3 hours.

The catalyst thus prepared was used in a cyclic process of hydrogen peroxide production using a treble mixture of quinone, viz., 110 g./liter of 2-ethylanthraquinone, 90 g./liter of tetrahydro-2-ethylanthraquinone, and 30 to 40 g./liter of tetrahydroanthraquinone, with a total concentration of 230 to 240 g./liter.

The hydrogenation was conducted at 60 to 65°. The hydrogen peroxide yield was 19 to 20 g./liter, the concentration of the extracts recovered exceeded 40 percent by weight.

Likewise, there were no changes either in the composition of the working solution or in the ratios of quinones.

What is claimed is:

1. A process for the production of hydrogen peroxide, said process comprising hydrogenating at a temperature up to 65° C. at least one anthraquione in solution with an anthraquinone selective nickel catalyst, said catalyst being prepared by leaching same from a nickel-aluminum alloy with a first aqueous alkali solution at the boiling point of said alkali solution, and with a second aqueous alkali solution at a temperature of 130°–150° C., said leaching at 130°–150° C. imparting selectivity to said catalyst to obtain a hydrogenation product and oxidizing said hydrogenation product to form hydrogen peroxide.

2. A process as claimed in claim 1 wherein a mixture of 2-ethylanthraquinone, tetrahydro-2-ethylanthraquinone and tetrahydroanthraquinone are hydrogenated.

3. A process as claimed in claim 1 wherein a mixture of 2 - ethylanthraquinone, tetrahydro - 2 - ethylanthraquinone and tetrahydro-2-methylanthraquinone are hydrogenated.

4. A process as claimed in claim 1 wherein said leaching at 130°–150° C. is effected for 1–3 hours.

5. A process as claimed in claim 1 wherein said at least one alkylanthraquinone is dissolved in a mixture of α-methyl naphthalene and secondary octanol.

6. A process as claimed in claim 1 wherein hydrogenating is effected at a temperature of 40–65° C.

7. A catalyst for hydrogenating alkaylanthraquinones, said catalyst being prepared by leaching a nickel-aluminum alloy with a first aqueous solution of sodium hydroxide at the boiling point of said first aqueous solution of sodium hydroxide and then with a second aqueous solution of sodium hydroxide at a temperature of 130°–150° C. for a period of 1–3 hours.

References Cited

UNITED STATES PATENTS 2,689,168  9/1954  Hinegardner _____ 23—207

FOREIGN PATENTS 227,238  5/1963  Germany.
796,461  6/1958  Great Britain.

EDWARD J. MEROS, Primary Examiner.
H. S. MILLER, Assistant Examiner.